US008886648B1

(12) United States Patent
Procopio et al.

(10) Patent No.: US 8,886,648 B1
(45) Date of Patent: Nov. 11, 2014

(54) SYSTEM AND METHOD FOR COMPUTATION OF DOCUMENT SIMILARITY

(75) Inventors: Michael Jeffrey Procopio, Boulder, CO (US); Guy Cobb, Boulder, CO (US); Daryl Lonnon, Superior, CO (US)

(73) Assignee: Google Inc., Mountain View, CA (US)

( * ) Notice: Subject to any disclaimer, the term of this patent is extended or adjusted under 35 U.S.C. 154(b) by 91 days.

(21) Appl. No.: 13/363,024

(22) Filed: Jan. 31, 2012

(51) Int. Cl.
*G06F 17/30* (2006.01)

(52) U.S. Cl.
USPC .......................................................... 707/737

(58) Field of Classification Search
CPC ............................................... G06F 17/30011
USPC .......... 707/715, 728, 737, 738, 741, 748, 769
See application file for complete search history.

(56) References Cited

U.S. PATENT DOCUMENTS

| | | | |
|---|---|---|---|
| 5,873,056 A | 2/1999 | Liddy et al. | |
| 5,963,940 A | 10/1999 | Liddy et al. | |
| 6,236,987 B1 | 5/2001 | Horowitz et al. | |
| 6,349,307 B1 | 2/2002 | Chen | |
| 7,065,532 B2 | 6/2006 | Elder et al. | |
| 7,080,082 B2 | 7/2006 | Elder et al. | |
| 7,103,609 B2 | 9/2006 | Elder et al. | |
| 7,129,123 B2 | 10/2006 | Sakurada et al. | |
| 7,130,844 B2 | 10/2006 | Elder et al. | |
| 7,249,123 B2 | 7/2007 | Elder et al. | |
| 7,257,569 B2 | 8/2007 | Elder et al. | |
| 7,765,212 B2 | 7/2010 | Surendran et al. | |
| 7,853,594 B2 | 12/2010 | Elder et al. | |
| 7,860,811 B2 | 12/2010 | Flinn et al. | |
| 8,094,722 B2 | 1/2012 | Wang | |
| 8,135,064 B2 | 3/2012 | Tasaka et al. | |
| 8,255,421 B2 | 8/2012 | Maeda et al. | |
| 8,320,470 B2 | 11/2012 | Huang et al. | |
| 8,369,402 B2 | 2/2013 | Kobayashi et al. | |
| 2004/0088315 A1 | 5/2004 | Elder et al. | |
| 2004/0088322 A1 | 5/2004 | Elder et al. | |

(Continued)

OTHER PUBLICATIONS

James Allan, "Topic Detection and Tracking-Event-Based Information Organization," 2002, Kluwer Academic Publishers, Norwell, Massachusetts, USA; http://books.google.com/books?hl=en&lr=&id=50hnLI_Jz3cC&oi=fnd&pg=PR9&dq=topic+detection+and+tracking+event-based+information+organization&ots=nfu5nDwUa0&sig=U2ITFv2_AMnciqo9J8WLaS9lv98#v=onepage&q=topic%20detection%20and%20tracking%20event-based%20inform&f=false (last visited on Jan. 31, 2012).

(Continued)

*Primary Examiner* — Apu Mofiz
*Assistant Examiner* — Cindy Nguyen
(74) *Attorney, Agent, or Firm* — Young Basile Hanlon & MacFarlane P.C.

(57) ABSTRACT

A method for searching for documents may include receiving information for a source document, the information including at least one topic and a weight for each topic, where the topic relates to content of the source document, and the weight represents how strongly the topic is associated with the source document, accessing an index containing topics and references to documents containing those topics and selecting a set of documents, where each document in the set is associated with at least one of the topics in the source document, generating similarity scores based on the weight of a topic in the source document and a weight of the same topic in each document within the set of documents having that topic, and selecting a subset of documents from the set of documents based on the similarity scores.

22 Claims, 5 Drawing Sheets

(56) References Cited

U.S. PATENT DOCUMENTS

| | | | |
|---|---|---|---|
| 2004/0088649 | A1 | 5/2004 | Elder et al. |
| 2004/0254911 | A1 | 12/2004 | Grasso et al. |
| 2005/0198044 | A1 | 9/2005 | Kato et al. |
| 2006/0195461 | A1 | 8/2006 | Lo et al. |
| 2007/0078889 | A1 | 4/2007 | Hoskinson |
| 2007/0150470 | A1 | 6/2007 | Brave et al. |
| 2009/0287682 | A1 | 11/2009 | Fujioka et al. |
| 2009/0319907 | A1 | 12/2009 | Tokuda |
| 2010/0003658 | A1 | 1/2010 | Fadel et al. |
| 2010/0023311 | A1 | 1/2010 | Subrahmanian et al. |
| 2010/0094879 | A1* | 4/2010 | Donnelly et al. ............. 707/749 |
| 2010/0205541 | A1 | 8/2010 | Rapaport et al. |
| 2010/0306204 | A1* | 12/2010 | Chitiveli et al. ............. 707/752 |
| 2011/0016121 | A1 | 1/2011 | Sambrani et al. |
| 2011/0029534 | A1 | 2/2011 | Maeda et al. |
| 2011/0113040 | A1 | 5/2011 | Bickel et al. |
| 2011/0145719 | A1 | 6/2011 | Chen et al. |
| 2011/0197166 | A1 | 8/2011 | Girgensohn et al. |
| 2011/0249741 | A1 | 10/2011 | Zhao et al. |
| 2011/0258229 | A1 | 10/2011 | Ni et al. |
| 2012/0039388 | A1 | 2/2012 | Kim et al. |
| 2012/0136812 | A1 | 5/2012 | Brdiczka |
| 2012/0158731 | A1* | 6/2012 | Gherman et al. ............. 707/741 |
| 2012/0173561 | A1 | 7/2012 | Kim et al. |
| 2012/0215791 | A1* | 8/2012 | Malik et al. ................... 707/749 |
| 2012/0287998 | A1 | 11/2012 | Sato |

OTHER PUBLICATIONS

Stefan Siersdorfer and Sergej Sizov, "Automatic Document Organization in a P2P Environment," 2006, Springer, Berlin, Germany; http://www.springerlink.com/content/27140h768278629r/ (last visited on Jan. 31, 2012).

Dr. E. Garcia, "Cosine Similarity and Term Weight Tutorial," http://www.miislita.com/information-retrieval-tutuorial/cosine-similarity-tutorial.html (last visited on Jan. 30, 2012).

U.S. Appl. No. 13/363,067, filed Jan. 31, 2012, Procopio et al.

U.S. Appl. No. 13/363,152, filed Jan. 31, 2012, Procopio.

U.S. Appl. No. 13/363,126, filed Jan. 31, 2012, Procopio.

U.S. Appl. No. 13/363,094, filed Jan. 31, 2012, Procopio et al.

U.S. Appl. No. 13/363,210, filed Jan. 31, 2012, Procopio.

U.S. Appl. No. 13/363,169, filed Jan. 31, 2012, Procopio.

U.S. Appl. No. 13/363,195, filed Jan. 31, 2012, Procopio.

U.S. Appl. No. 13/363,221, filed Jan. 31, 2012, Procopio.

U.S. Office Action, mailed on Nov. 21, 2012, in the related U.S. Appl. No. 13/363,169.

Notice of Allowance mailed on Feb. 11, 2013, in the related U.S. Appl. No. 13/363,221.

Bo Pang et al., Thumbs up Sentiment Classification Using Machine Learning Techniques, Proceedings of the 2002 Conference on Empirical Methods in Natural Language Processing (EMNLP) 2002, pp. 79-86.

* cited by examiner

SYSTEM AND METHOD FOR COMPUTATION OF DOCUMENT SIMILARITY

CROSS REFERENCES TO RELATED APPLICATIONS

The following U.S. patent applications are filed concurrently herewith and are assigned to the same assignee hereof and contain subject matter related, in certain respect, to the subject matter of the present application. These patent applications are incorporated herein by reference.

Ser. No. 13/363,067, filed Jan. 31, 2012 for "SYSTEM AND METHOD FOR INDEXING DOCUMENTS";

Ser. No. 13/363,152, filed Jan. 31, 2012 for "SYSTEM AND METHOD FOR CONTENT-BASED DOCUMENT ORGANIZATION AND FILING", now U.S. Pat. No. 8,458,194;

Ser. No. 13/363,126, filed Jan. 31, 2012 for "SYSTEM AND METHOD FOR DETERMINING ACTIVE TOPICS", now U.S. Pat. No. 8,458,193;

Ser. No. 13/363,094, filed Jan. 31, 2012 for "SYSTEM AND METHOD FOR AUTOMATICALLY DETERMINING DOCUMENT CONTENT";

Ser. No. 13/363,210, filed Jan. 31, 2012 for "SYSTEM AND METHOD FOR DETERMINING TOPIC AUTHORITY", now U.S. Pat. No. 8,458,196;

Ser. No. 13/363,169, filed Jan. 31, 2012 for "SYSTEM AND METHOD FOR DETERMINING TOPIC INTEREST", now U.S. Pat. No. 8,458,192;

Ser. No. 13/363,195, filed Jan. 31, 2012 for "SYSTEM AND METHOD FOR DETERMINING SIMILAR USERS", now U.S. Pat. No. 8,458,195; and Ser. No. 13/363,221, filed Jan. 31, 2012 for "SYSTEM AND METHOD FOR DETERMINING SIMILAR TOPICS, ", now U.S. Pat. No. 8,458,197.

BACKGROUND

Databases may include large quantities of documents, and it may be desirable to determine similarity between the contents of those documents. Given the large quantities of documents stored in many systems, document similarity comparison operations may be computationally cumbersome.

SUMMARY

Briefly, aspects of the present disclosure are directed to methods and systems for indexing and searching documents, which may include receiving information for a source document, the information including at least one topic and a weight for each topic, where the topic relates to content of the source document, and the weight represents how strongly the topic is associated with the source document. An index containing topics and references to documents containing those topics may be accessed and a set of documents may be selected, where each document in the set is associated with at least one of the topics in the source document. Similarity scores may be generated based on the weight of a topic in the source document and a weight of the same topic in each document within the set of documents having that topic. A subset of documents may be selected from the set of documents based on the similarity scores.

This SUMMARY is provided to briefly identify some aspects of the present disclosure that are further described below in the DESCRIPTION. This SUMMARY is not intended to identify key or essential features of the present disclosure nor is it intended to limit the scope of any claims.

The term "aspects" is to be read as "at least one aspect". The aspects described above and other aspects of the present disclosure described herein are illustrated by way of example (s) and not limited in the accompanying figures.

BRIEF DESCRIPTION OF THE DRAWINGS

A more complete understanding of the present disclosure may be realized by reference to the accompanying figures in which.

The illustrative aspects are described more fully by the Figures and detailed description. The present disclosure may, however, be embodied in various forms and is not limited to specific aspects described in the Figures and detailed description.

DESCRIPTION

The following merely illustrates the principles of the disclosure. It will thus be appreciated that those skilled in the art will be able to devise various arrangements which, although not explicitly described or shown herein, embody the principles of the disclosure and are included within its spirit and scope.

Furthermore, all examples and conditional language recited herein are principally intended expressly to be only for pedagogical purposes to aid the reader in understanding the principles of the disclosure and the concepts contributed by the inventor(s) to furthering the art, and are to be construed as being without limitation to such specifically recited examples and conditions.

Moreover, all statements herein reciting principles and aspects of the disclosure, as well as specific examples thereof, are intended to encompass both structural and functional equivalents thereof. Additionally, it is intended that such equivalents include both currently known equivalents as well as equivalents developed in the future, e.g., any elements developed that perform the same function, regardless of structure.

Thus, for example, it will be appreciated by those skilled in the art that any block diagrams herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable medium and so executed by a computer or processor, whether or not such computer or processor is explicitly shown.

The functions of the various elements shown in the Figures, including any functional blocks labeled as "processors", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and nonvolatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

Unless otherwise explicitly specified herein, the drawings are not drawn to scale.

Figure 1:
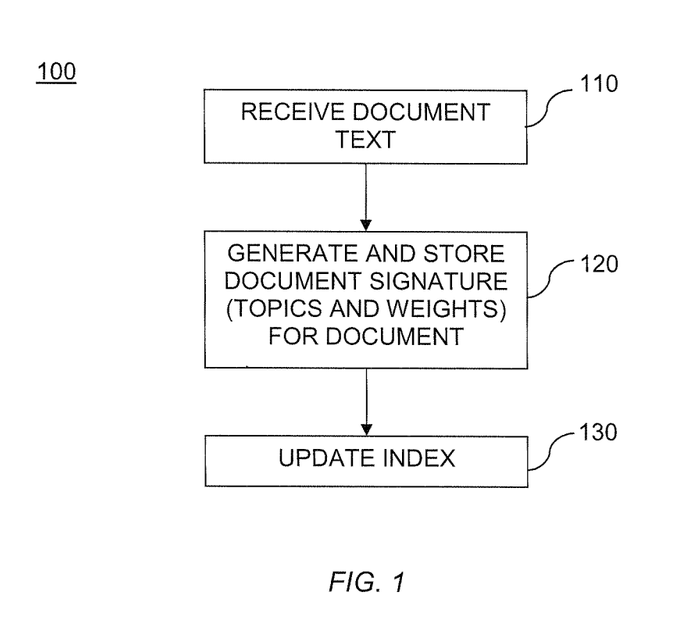
FIG. 1 is a flowchart of a method according to aspects of the present disclosure.
Figure 5:
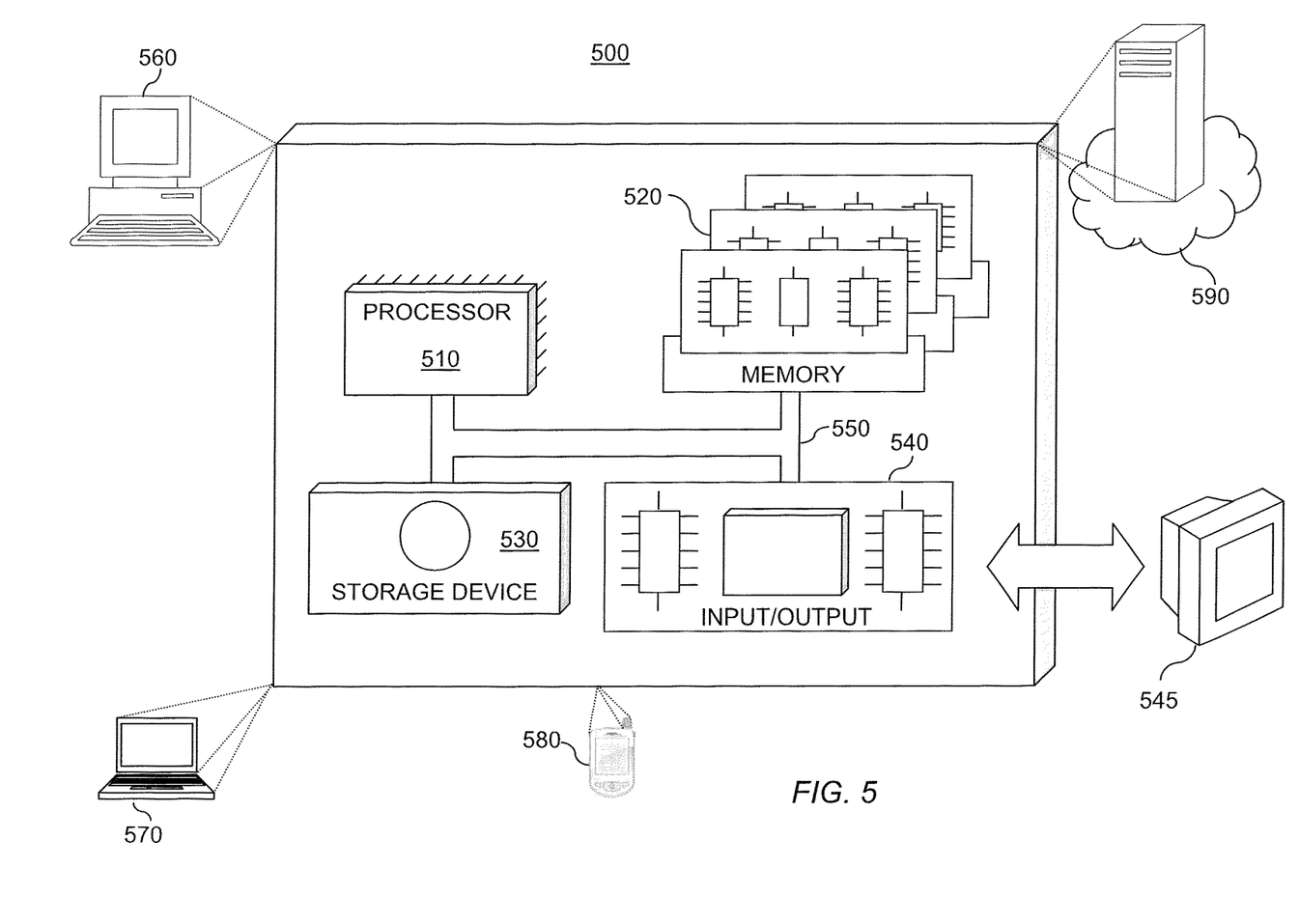
FIG. 5 is a schematic diagram depicting a representative computer system for implementing and exemplary methods and systems for indexing and searching documents according to aspects of the present disclosure.

In FIG. 1, there is shown a flow diagram 100, which broadly defines steps of a method according to aspects of the present disclosure. Methods and systems of the present disclosure may be implemented using, for example, a computer system 500 as depicted in FIG. 5 or any other system and/or device. In operation 110, document text may be received by, for example, system 500. Document text may be, for example, a text-based representation of a document. The document may contain text (e.g., word processing document, text file, spreadsheet or presentation), or may have text associated therewith, such as in a transcript, when the document is a video (e.g., a web-based video or any other type of video) or an audio file (e.g., an audio recording, podcast, or any type of audio), or another type of electronically stored file. Document text may be present in a document text file separate from the document. In that case, the document text file may be linked to and/or stored with the document and/or may be stored separately. It will be understood that operations involving the text of a document may be performed on or with the document or the document text file depending on the location of text.

In operation 120, a document signature may be generated and stored. A document signature may include, for example, topics relating to a text of a document (e.g., a source document), a weight for each topic, and possibly other information. Topics related to text of a document may be generated using natural language processing (NLP) or a similar method or process. A natural language processor may, for example, receive a document text and generate or determine topics related to the document text. Topics may be, for example, categories, abstract ideas, subjects, things, and/or concepts representing the content or subject matter of a document. Topics may be, for example, an abstract notion of what a document text pertains to, is related to, or is about. By way of example, topics may be vehicles, scientific principles, animals, restaurants, or any other concept(s).

A topic may, in some aspects, be a concept that at least a portion of the document is about. A topic may or may not be a term present in a document text but may be, for example, associated with one or more terms present in a document and may be generated by natural language processing or other processes based on one or more terms in a document and/or other information. For example, a document may include text about cars, planes, and boats, all of which appear as terms verbatim in the document. More abstractly, however, it may be determined that the document is about "vehicles" and "modes of transportation." Topics associated with the document may, therefore, be "vehicles," "modes of transportation," and/or other topics.

A weight (e.g., a topic weight or confidence score) may represent how strongly a topic is associated with a document (e.g., document text). A weight may be, for example, a percentage (e.g., between 0% and 100%), a numeric value (e.g., between 0 and 1.0 or any other range), a vector, a scalar, or another parameter, which quantifies or represents how strongly a topic is associated with a document. For example, a document may include text or information relating to one or more topics, and a weight associated with each topic may represent or quantify how much a document text pertains to, is about, or is related to each topic. A sum of weights for all topics associated with a document may, for example, be equal to 1.0, 100%, or another value.

In operation 130, an index may be updated by, for example, inserting a reference for each of one or more topics in a document text. An index may be, for example, a list, table, database, and/or organized set of information. An index may be, for example, associated with a set of documents (e.g., a folder, group of documents, or document label(s)). An index may include multiple topics and references to documents including each topic. In some aspects, an index may be a table including a list of one or more topics and a corresponding list of one or more documents that include the one or more topics.

An index may, for example, be updated by inserting a reference for each of one or more topics associated with a document. An index may be updated by adding any topics associated with a document not already represented in the index, and adding a reference to the document for each of the added topics. A reference to the document may also be added to any existing topics in the index that are associated with the document. Accordingly, a reference to a document may be removed from the index for a topic when that topic is no longer associated with that document.

By way of example, three or any other number of topics relating to a text of a document may be received. Of the topics, two topics may have been previously inserted in an index, and one topic may not have been previously included in the index. For the two topics previously inserted in the index, a corresponding reference to the document may be inserted. For the one topic not previously included in the index, that one topic may be added to the index, and a corresponding reference to the document may be associated with the one topic. Accordingly, a topic may optionally be removed from the index when no documents are associated with the topic.

Updates to the index may be generated in response to a trigger event. A trigger event may be, for example, creation or deletion of a document, an addition or removal of a document to or from a document set, a change of content of a document, a change of signature of a document. A trigger event may, for example, occur at any time and may be the result of user input, other processes or systems, or other factors. In one aspect, a trigger may occur when content of a document changes, for example, when a user adds or deletes text in a document. A trigger may occur at a predetermined time or at a predetermined time interval. A trigger may occur due to a change in a master list of topics, such that new topics are available and/or existing topics are deleted and no longer applicable for association with documents. In some aspects, documents may be constantly monitored or monitored in real-time (e.g., by system 500) to identify trigger events.

Updating an index (e.g., including reference to one or more topics and documents including each topic) may be advantageous by enabling very fast (e.g., computationally efficient) lookup of referenced documents given a topic and/or other information. Updating an index according to methods and systems discussed herein may ensure very fast, accurate, and reliable results in response to a query for documents given a topic. Other benefits may of course be realized.

Figure 2:
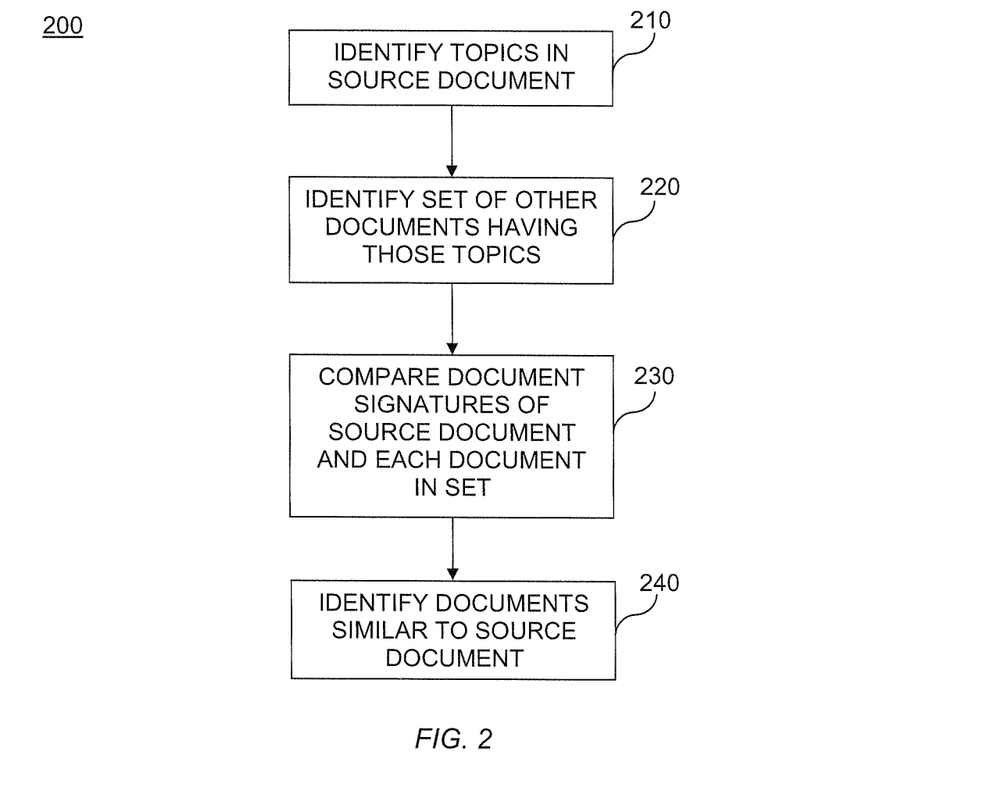
FIG. 2 is a flowchart of a method according to aspects of the present disclosure.

In FIG. 2, there is shown a flow diagram 200, which defines steps of a method according to aspects of the present disclosure. In operation 210, topics in a source document may be identified. A source document may be any type of document including, for example, a text document, text transcript of a video, text of an audio file, or any other type of file. Topics in a source document may be identified or determined using, for example, a natural language processor or other systems or methods. Information for a source document (e.g., a source document signature) may include at least one tope and a weight for each topic. A topic may be associated with document content, and a weight may represent how strongly a topic is associated with a document (e.g., a source document). Information for a source document or a source document signature may be a vector or list, which includes, for example, at least one topic, a weight for each tope, and/or other information.

In operation 220, a set of documents (e.g., documents other than a source document) having topics in common with a source document may be identified. A set of documents may be identified by accessing an index including topics and references to documents including those topics and selecting a set of documents. Each document in a selected set of documents may be associated with at least one topic in a source document. A set of documents may, therefore, include one or more documents, which each include at least one topic in common with a source document.

In operation 230, document signatures of a source document and each document in a set of documents may be compared. A document signature of a source document may, for example, be compared to each document signature associated with each document in a set of documents. Each comparison may be between two documents (e.g., a source document and a document in a set of documents). In comparing document signatures, a weight of a topic associated with a source document may be compared to a weight of the same topic in each document within a set of documents, and similarity scores may be generated based on the comparison (e.g., one similarity score may be computed for each pair-wise document comparison between the source document and a document within the set of documents). A process of generating similarity scores may be repeated for each topic in a source document.

A similarity score may be generated by computing a sum of products of topic weights, a cosine similarity of topic weights, or using other mathematical approaches. A similarity score may be generated by computing a sum of products of topic weights in a source document and respective topic weights in a document within a document set. For example, a similarity score between a source document and a document within a document set may be computed by multiplying a first topic weight in the source document by a first topic weight in the document in the document set. The process may be repeated for each topic weight in each document.

In some aspects, a particular topic weight for a document may be zero, if no portion of the document content or text is about the topic. A product of a topic weight of zero in a first document multiplied the topic weight of the same topic in a second document may be, for example, zero, indicating no similarity between the two documents with respect to that topic.

In some aspects, similarity scores may be generated by computing or calculating a cosine similarity of weights for each topic in a source document. A cosine similarity, Sim(S, D), may be calculated using an equation such as:

$$Sim(S, D) = \cosine\theta = \frac{S \cdot D}{\|S\|\|D\|}$$

A cosine similarity, Sim(S,D), may, for example, be calculated based on a vector representing source document topic weights, S, and a vector representing topic weights of a document in a document set, D. A cosine similarity score may be, for example, a normalized dot product of a vector representing weights of topics in a source document, S, and a vector representing topic weights in a document included in a document set, D. A vector representing source document topic weights, S, may include weights for each topic in a source document. A vector representing topic weights of a document within a document set, D, may include weights for each topic in the document within the document set. If a source document or a document within a document set does not include a topic, a weight of zero may be included in a vector representing topic weights for that document.

A dot product or sum of products may be normalized by dividing the dot product by a product of a norm of a vector representing source document topic weights, $\|S\|$, and a norm of a vector representing topic weights of a document in a document set, $\|D\|$. A vector norm may, for example, be a length and/or magnitude of a vector (e.g., Euclidian distance of a vector). Normalizing the dot product may, for example, ensure that each similarity score (e.g., cosine similarity score) is between 0 and 1 or another range.

A cosine similarity score or parameter may be a quantity representing how similar a vector representing weights of topics in a first document is to a vector representing weights of topics in second document. A cosine similarity score may be, for example, a number between 0 and 1, a percentage, any range of numbers, or other value.

In operation 240, documents similar to a source document may be identified. A subset of documents that are similar to a source document may be selected from a set of documents based on similarity scores. A set of documents may be all documents that include a topic that is included in a source document, and a subset of documents may, for example, be selected based on a similarity score.

A subset of documents may, for example, be a group or cluster of documents selected based on a threshold similarity score. A subset of documents may, for example, be a subset of documents associated with a similarity score greater than a predetermined threshold similarity score. A predetermined threshold similarity score may be, for example, a static predetermined threshold similarity score or a varying threshold similarity score. A varying threshold similarity score may be generated, for example, using an automatic threshold determination process or other approaches. A threshold similarity score may be used in a clustering approach (e.g., K-means clustering, hierarchical agglomerative clustering, or another clustering method or system) to group or cluster a subset of documents.

A subset of documents may include a cluster of documents associated with best, high, or most favorable similarity scores. For example, a subset of documents may be a predetermined number of documents with best or most favorable similarity scores. Best or most favorable similarity scores may be, for example, similarity scores indicating a highest similarity between a source document and documents within a subset of documents.

In some aspects, a subset of documents may be limited to a maximum predetermined number of documents. A maximum predetermined number of documents may be set by a user (e.g., in a settings dialog, panel, screen, menu, and/or other interface), may be automatically set, or may be set by another party.

According to some aspects, an identity of a subset of documents selected based on similarity scores may be output for display to a user. An identity of a subset of documents may be output to a user, for example, as a list of document, a table, a graphical representation, a word cloud, a graphical model, or another form of data output. A subset of documents selected bases on similarity scores may, for example, be labeled related documents and may be output to a user as a list of "Related Documents" or any other type of list. A subset of documents may be output to a user using a display device (e.g., display 545 of FIG. 5).

In some aspects, an identity of a subset of documents and a representation of corresponding similarity scores may be output for display to a user. A representation of corresponding similarity scores may be, for example, a list of similarity scores, a graphical representation of similarity scores (e.g., a graphical model, graph, plot, bar graph, pie chart, or other graphical representation), a list of similarity scores (e.g., a list or table of similarity scores in a preview pane, window, or other displays), or other type of data representation.

According to some aspects of the present disclosure, a representation of the similarity between a source document and a document from the subset of document may be output to a user.

In some aspects, an identity of a subset of documents and a representation of corresponding similarity scores may be output for display to a user based on input from a user. System 500 may, for example, enable a user to select a source document. A user may provide input by selecting a source document, and a subset of documents similar to or related to the source document may be determined by the system 500. The subset of selected documents and/or a representation of a similarity between a source document and each document in the subset of documents may be output to a user. A representation of similarity may be based, for example, on a similarity score between a source document and a document in a subset of documents.

According to some aspects, the identity of one or more highest weighted overlapping topics may be output to a user. Highest weighted overlapping topics may be determined based on the similarity score. A similarity score may, for example, be generated by computing a sum of products (e.g., a cosine similarity) of topic weights in a source document and respective weights in document within a document set. Within a sum of products of topic weights, certain topic weights may contribute more to the sum of products. A highest product term in a sum of products may, for example, contribute the most to a final similarity score. A topic associated with or corresponding to the highest product term may, therefore, contribute most to the similarity between two documents. Topics that contribute the most to a similarity score between two documents may be common topics or overlapping topics. One or more highest weighted overlapping or common topics may, for example, be output to a user. One or more highest weighted overlapping topics may, for example, quantify or represent why two documents are related or similar.

Figure 3:
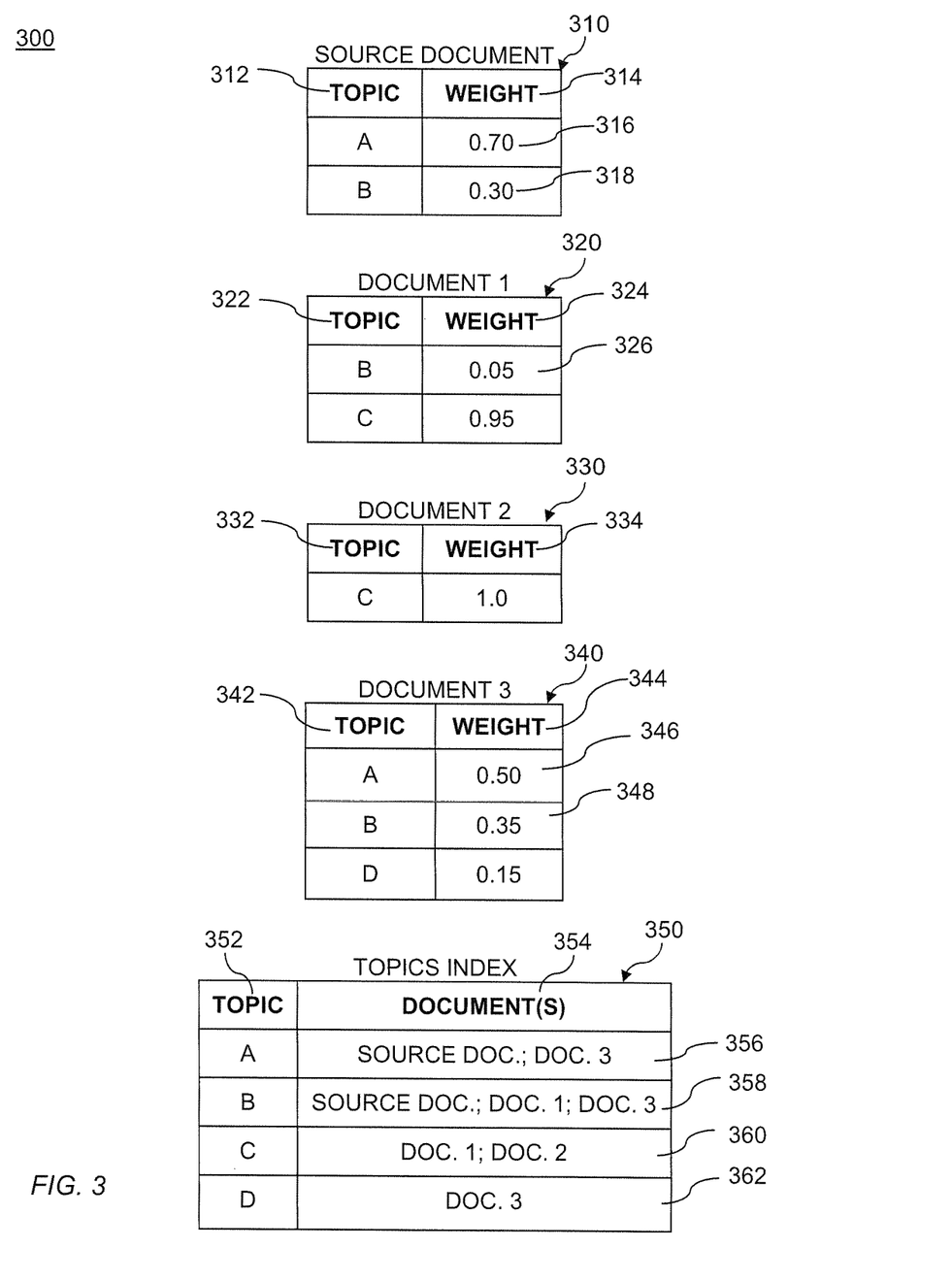
FIG. 3 is a diagram depicting document topics, weights, and a topic index associated with one or more documents according to aspects of the present disclosure.

FIG. 3 shows a schematic diagram 300 depicting topics, weights, and a topic index associated with one or more documents according to aspects of the present disclosure. Information for a Source Document 310 (e.g., a Source Document signature) may include one or more topics 312 (e.g., two topics) and a weight 314 for each topic. Topics 312 relating to a Source Document may include, for example, topic A and topic B. Topic A and topic B may be any two topics (e.g., restaurants, legal document types, medical, or any other topics). Each topic may be associated with a weight, for example, topic A weight 316 and topic B weight 318. Source Document topic weights 314 may represent or quantify how strongly a topic is associated with Source Document text. Topic A weight 316 may indicate, for example, that 0.70 or 70 percent (%) of a Source Document is about or related to topic A. Similarly, topic B weight 318 may indicate that 0.30 or 30% of a Source Document is about or related to topic B. Topic weights (e.g., topic A weight or topic B weight) associated with each topic in a document text may, for example, sum to 1.0, 100%, or any other value.

Topic weights may, in some aspects, represent a confidence of association of a topic and a document (e.g., by a natural language processor or other method or system). A topic weight (e.g., corresponding to a topic) may represent a confidence, certainty, and/or likelihood that a document is in whole or in part about that topic. For example, topic A weight 316 (e.g., 0.70 or 70%) may indicate a confidence of 70% that the Source Document is in whole or in part about topic A, and topic B weight 318 (e.g., 0.30 or 30%) may indicate a confidence of 30% that the Source Document is in whole or in part about topic B.

Information for a first document 320 (e.g., Document 1) may include one or more topics 322 (e.g., two topics) and a weight 324 for each topic. Topics 322 relating to a first document may include, for example, a topic B and topic C, and each topic may be associated with a weight 324, for example, topic B weight and topic C weight. Topic B weight may indicate, for example, that 0.05 or 5% of a first document text is about topic B, and topic C weight may indicate that 0.95 or 95% of the first document text is about topic C. Topic weights (e.g., topic weight B and topic weight C) may, for example, sum to 1.0, 100%, or another value.

Information for a second document 330 (e.g., Document 2) may include one topic 332 (e.g., one topic) and a corresponding weight 334. Topic C weight may indicate that 1.0 or 100% of Document 2 is about topic C or that Document 2 is only about topic C.

Information for a third document 340 (e.g., Document 3) may include one or more topics 342 (e.g., three topics) and weights 344 for each topic. Topics 342 relating to a third document may include, for example, topic A, topic B, and topic D. Each topic may be associated with a weight, for example, topic A weight, topic B weight, and topic D weight.

A topics index 350 may be updated by inserting a reference 354 to documents including each of one or more topics 352. Index 350 may include or may be updated to include one or more topics 352 and reference(s) to document(s) 354 including those topics. A topics index 350 may include, for example, topics A, B, C, and D. Topics index 350 may also include references 356 to documents that include topic A (e.g., Source Document and Document 3), references 358 to documents that include topic B (e.g., Source Document, Document 1 and Document 3), references 360 to documents that include topic C (e.g., Document 1 and Document 2), and references 362 to document(s) that include topic D (e.g., Document 3).

For clarification, in some aspects, a Source Document may not have a special distinction or notation in a topics index 350 and may, therefore, not be labeled as a Source Document. A topics index 350 may be its own single entity and may include references to all documents. A topics index 350 may, for example, include no notion of what a Source Document is. In this example, a document may be labeled as a Source Document in the topics index 350 for purposes of explanation; however, in some aspects, Source Document may not be distinctly labeled (e.g., Source Document) in a topics index 350, and may be any document in the index 350 (e.g., Document N).

A topics index 350 may be accessed by, for example, system 500, and a set of documents 354 may be selected. Source Document information 310 may, for example, include two topics 312 (e.g., topic A and topic B) and weights 314 representing how strongly each topic is associated with the Source Document. A topics index 350 may be accessed to select or determine a set of documents, where each document in the set is associated with at least one of the topics in a Source Document information 310. In this example, Document 1 and Document 3 may be selected because each of Document 1 and Document 3 is associated with at least one of the topics 312 (e.g., topic A and topic B) in Source Document information 310. Document 2 and possibly other documents may be removed from consideration.

Similarity scores may be generated based on a weight 314 of a topic in a Source Document and a weight of the same topic in each document within the set of documents having that topic. Similarity scores may be generated by, for example, computing or calculating a sum of products of weights for each topic. A similarity score may be, for example, a sum of topic weight to topic weight product terms between two documents. Topic weight product terms may be, for example, a product of a topic weight in a first document and the same topic weight in a second document. A similarity score (e.g., between two documents) may be, for example, a sum of all product terms across all topics in each of two documents. For example, a similarity score based on a weight of topic A 316 in Source Document and a weight of topic A 346 in Document 3 may be generated by calculating a product of the weight of topic A 316 in the Source Document (e.g., 0.70) and the weight of topic A 346 in Document 3 (e.g., 0.50).

A similarity score generation process may be repeated for each topic in Source Document information 310. For example, a similarity score based on a weight of topic B 318 in the Source Document (e.g., 0.30) and a weight of topic B 326 in Document 1 (e.g., 0.05) may be generated. A similarity score between a weight of topic B 318 in the Source Document (e.g., 0.30) and a weight of topic B 348 in Document 3 (e.g., 0.35) may be generated.

Figure 4:
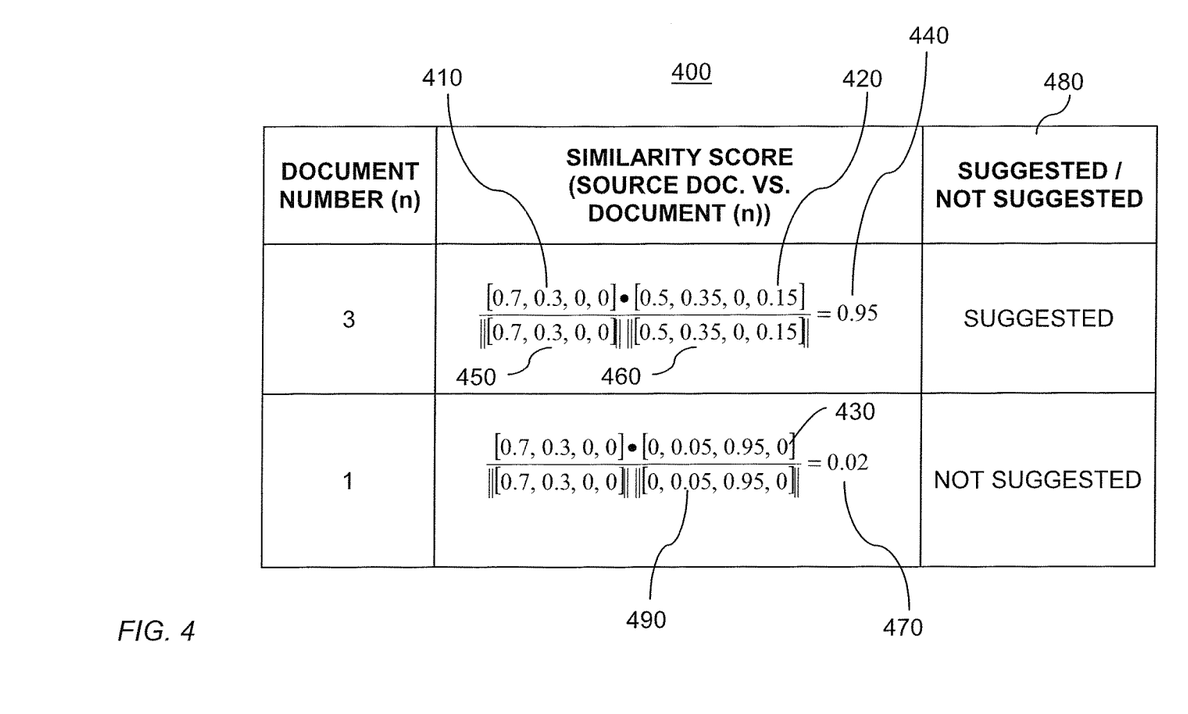
FIG. 4 is a diagram depicting documents and similarity scores associated with one or more documents according to aspects of the present disclosure.

FIG. 4 shows a diagram 400 depicting documents and similarity scores associated with one or more documents according to aspects of the present disclosure. Similarity scores may be generated by, for example, computing a cosine similarity of weights for each topic. Weights of topics 410 in Source Document may be, for example, a vector of topic weights (e.g., [0.7, 0.3, 0, 0], where a weight of topic A 316 is equal to 0.7, a weight of topic B 318 is equal to 0.3, and weights of topics C and D are equal to zero). Weights of topics 420 in Document 3 may be, for example, a vector of topic weights (e.g., [0.5, 0.35, 0, 0.15]). Weights of topics 430 in Document 1 may be, for example, a vector of topic weights (e.g., [0, 0.05, 0.95, 0]).

A cosine similarity of weights 440 may be computed by calculating a dot product of a vector representing topic weights in Source Document 410 (e.g., [0.7, 0.3, 0, 0]) and a vector representing topic weights in Document 3 420 (e.g., [0, 0.05, 0.95, 0]) and dividing the dot product by the product of the norm of the vector representing topic weights in Source Document 450 (e.g., ‖[0.7, 0.3, 0, 0]‖) and the norm of the vector representing topic weights in Document 3 460 (e.g., ‖[0.5, 0.35, 0, 0.15]‖). A cosine similarity of weights 440 between Source Document and Document 3 may, in this example, be equal to 0.95 or another value.

A cosine similarity of weights 470 may be computed by calculating a dot product of a vector representing topic weights in Source Document 410 (e.g., [0.7, 0.3, 0, 0]) and a vector representing topic weights in Document 1 430 (e.g., [0, 0.05, 0.95, 0]) and dividing the dot product by the product of the norm of the vector representing topic weights in Source Document 450 (e.g., ‖[0.7, 0.3, 0, 0]‖) and the norm of the vector representing topic weights in Document 1 490 (e.g., ‖[0, 0.05, 0.95, 0]‖). A cosine similarity of weights 470 between Source Document and Document 1 may, in this example, be equal to 0.021 or another value.

A subset of documents from the set of documents may be selected based on generated similarity scores (e.g., cosine similarity scores 440, 470). For example, a similarity score 440 between Source Document and Document 3 (e.g., 0.95 or another value) may be higher than a similarity score 470 between Source Document and Document 1 (e.g., 0.021 or another value). A ranked list of documents 480 based on similarity scores may include, for example, Document 3 ranked above Document 1. In one example, it may be specified that a highest ranked document is output to a user, and Document 3 may, for example, be selected and output to a user. In some aspects, any number of documents (e.g., a top N documents from a list and/or a subset including a top N documents from a list) may be output to user.

A subset of documents may be selected based on a predetermined threshold similarity score. For example, a similarity score 440 between Source Document and Document 3 may, for example, be higher than a predetermined threshold similarity score (e.g., 0.5 or any other threshold similarity score). In this example, Document 3 may be deemed a suggested document and the identity of Document 3 may be output for display to a user. A similarity score (e.g., a cosine similarity score) between Source Document and Document 1 470 may, for example, be lower than a predetermined threshold similarity score (e.g., 0.5 or any other threshold similarity score). In this example, Document 1 may be deemed a not suggested document and the identity of Document 1 may not be output to a user.

According to some aspects, an identity of one or more highest weighted overlapping topics may be output to a user. In this example, a highest product term in a sum of products of Source Document topic weights 314 and Document 3 topic weights 344 may be, for example, a product of Source Document topic A weight 316 and Document 3 topic A weight 346. Topic A may, therefore, contribute the most to a similarity score between Source Document and Document 3. Topic A may be deemed a highest weighted overlapping or common topic and may, for example, be output to a user. A list of related documents (e.g., Document 3) and one or more highest weighted overlapping topics (e.g., topic A) may be output to a user as a list, in a graphical representation, or other representation.

FIG. 5 shows an illustrative computer system 500 suitable for implementing methods and systems according to an aspect of the present disclosure. The computer system may comprise, for example, a computer running any of a number of operating systems. The above-described methods of the present disclosure may be implemented on the computer system 500 as stored program control instructions.

Computer system 500 includes processor 510, memory 520, storage device 530, and input/output structure 540. One or more input/output devices may include a display 545. One or more busses 550 typically interconnect the components, 510, 520, 530, and 540. Processor 510 may be a single or multi core.

Processor 510 executes instructions in which aspects of the present disclosure may comprise steps described in one or more of the Figures. Such instructions may be stored in memory 520 or storage device 530. Data and/or information may be received and output using one or more input/output devices.

Memory 520 may store data and may be a computer-readable medium, such as volatile or non-volatile memory, or any transitory or non-transitory storage medium. Storage device 530 may provide storage for system 500 including for example, the previously described methods. In various aspects, storage device 530 may be a flash memory device, a disk drive, an optical disk device, or a tape device employing magnetic, optical, or other recording technologies.

Input/output structures 540 may provide input/output operations for system 500. Input/output devices utilizing these structures may include, for example, keyboards, displays 545, pointing devices, and microphones—among others. As shown and may be readily appreciated by those skilled in the art, computer system 500 for use with the present disclosure may be implemented in a desktop computer package 560, a laptop computer 570, a hand-held computer, for example a tablet computer, personal digital assistant, mobile device, or smartphone 580, or one or more server computers that may advantageously comprise a "cloud" computer 590.

The systems and methods discussed herein and implemented using, for example, system 500, may be used to compute information and data related to billions of individual documents associated with millions of individual users in real-time. Individual users, for example, may each store, edit, modify, and otherwise manipulate thousands of documents. In some aspects of the present disclosure, generation, calculation, computation, determination and other methods and system operations discussed herein may be completed in parallel, simultaneously or in real-time for millions of individual users worldwide and/or globally.

At this point, while we have discussed and described the disclosure using some specific examples, those skilled in the art will recognize that our teachings are not so limited. Accordingly, the disclosure should be only limited by the scope of the claims attached hereto.

The invention claimed is:

1. A computer-implemented method for searching for documents, comprising:
   enabling a user to select a source document;
   receiving information for the source document, the information including at least one topic and a weight for each topic, where the topic relates to content of the source document, and the weight represents how strongly the topic is associated with the source document;
   accessing an index, stored in a memory, containing a plurality of topics and references to documents, each entry in the index storing a topic of the plurality of topics with a list of each of the documents containing the topic;
   selecting a set of documents by comparing the at least one topic of the source document to the entries of the index to obtain each list in the index that is stored with one or more entries in the index matching the at least one topic of the source document, each document of the set of documents having a respective document signature formed of at least one topic relating to content of the document and a weight for each topic;
   generating similarity scores based on the weight of a topic in the source document and a weight of the same topic in each document within the set of documents having that topic as indicated by the document signature;
   selecting a subset of documents from the set of documents based on the similarity scores; and
   outputting an identity of the subset of documents for display to the user.

2. The method of claim 1, wherein a sum of weights for all topics in one document equals 1.0 or 100%.

3. The method of claim 1, wherein the step of generating includes computing a normalized cosine similarity of weights for each topic.

4. The method of claim 1, wherein the step of generating is repeated for each topic in the source document.

5. The method of claim 1, wherein outputting the identity of the subset comprises outputting a graphical representation of the subset of documents.

6. The method of claim 1, wherein the subset comprises a cluster of documents associated with one or more best similarity scores.

7. The method of claim 1, further comprising outputting a representation of corresponding similarity scores for display to the user with the identity of the subset of documents.

8. The method of claim 7, wherein the representation comprises a graphical representation of corresponding similarity scores.

9. The method of claim 1, further comprising outputting the identity of one or more highest weighted overlapping topics to a user.

10. The method of claim 1, wherein the subset of documents is limited to a maximum predetermined number of documents.

11. The method of claim 1, wherein the subset of documents is selected based on a predetermined threshold similarity score.

12. The method of claim 1, wherein the similarity scores comprise normalized similarity scores.

13. A computer-implemented system for searching for documents, comprising:
   a memory storing an index containing a plurality of topics and references to documents, each entry in the index storing a topic of the plurality of topics with a reference to each of the documents containing the topic; and
   a processor programmed to:
      enable a user to select a source document;
      receive information for the source document, the information including at least one topic and a weight for each topic, where the topic relates to content of the source document, and the weight represents how strongly the topic is associated with the source document;
      access the index;
      select a set of documents in the index by comparing the at least one topic of the source document to the entries of the index to obtain each reference in the index that is stored with one or more entries in the index matching the at least one topic of the source document, each of the set of documents having a respective document signature formed of at least one topic relating to content of the document and a weight for each topic;
      generate similarity scores based on the weight of a topic in the source document and a weight of the same topic in each document within the set of documents having that topic as indicated by the document signature;
      select a subset of documents from the set of documents based on the similarity scores; and
      output an identity of the subset of documents for display to the user.

14. The system of claim 13, wherein to generate similarity scores the processor is programmed to compute a normalized cosine similarity of weights for each topic.

15. The system of claim 13, wherein to output the identity of the subset the processor is programmed to output a graphical representation of the subset of documents.

16. The system of claim 13 wherein the processor is programmed to:
output a representation of corresponding similarity scores for display to the user with the identity of the subset of documents.

17. The system of claim 16, wherein the representation comprises a graphical representation of corresponding similarity scores.

18. The system of claim 13 wherein the processor is programmed to:
output an identity of one or more highest weighted overlapping topics to a user.

19. The system of claim 13, wherein the subset of documents is selected based on a predetermined threshold similarity score.

20. The system of claim 13, wherein the similarity scores comprise normalized similarity scores.

21. A non-transitory computer storage medium having computer executable instructions which when executed by a computer cause the computer to perform operations comprising:
enabling a user to select a source document;
receiving information for the source document, the information including at least one topic and a weight for each topic, where the topic relates to content of the source document, and the weight represents how strongly the topic is associated with the source document;
accessing an index, stored in a memory, containing a plurality of topics and references to documents, each entry in the index storing a topic of the plurality of topics with a reference to each of the documents containing the topic;
selecting a set of documents by comparing the at least one topic of the source document to the entries of the index to obtain each reference in the index that is stored with one or more entries in the index matching the at least one topic of the source document, each of the set of documents having a respective document signature formed of at least one topic relating to content of the document and a weight for each topic;
generating similarity scores based on the weight of a topic in the source document and a weight of the same topic in each document within the set of documents having that topic as indicated by the document signature;
selecting a subset of documents from the set of documents based on the similarity scores; and
outputting an identity of the subset of documents for display to the user.

22. The computer storage medium of claim 21, wherein the step of generating includes computing a normalized cosine similarity of weights for each topic.

* * * * *